Patented June 7, 1927.

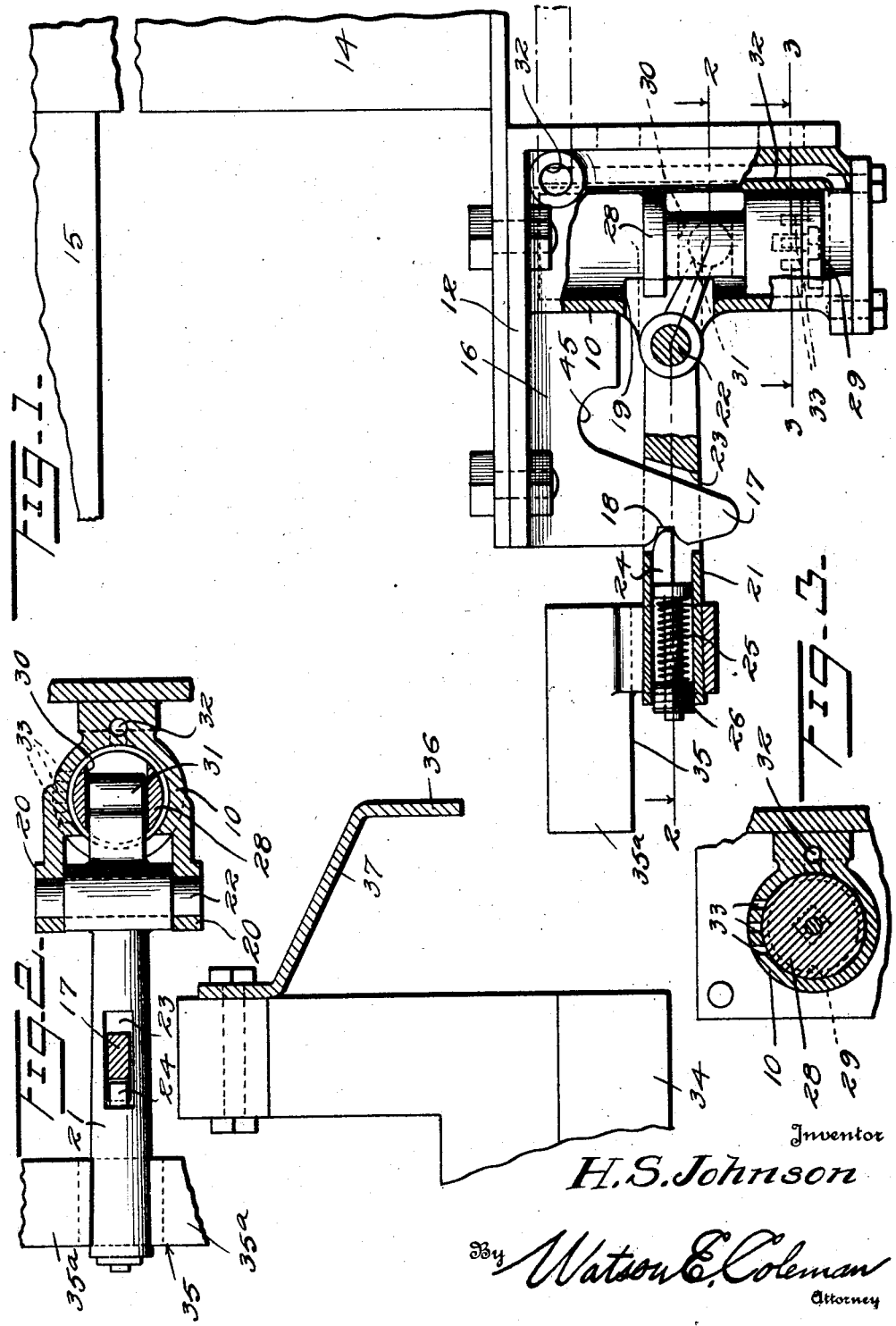

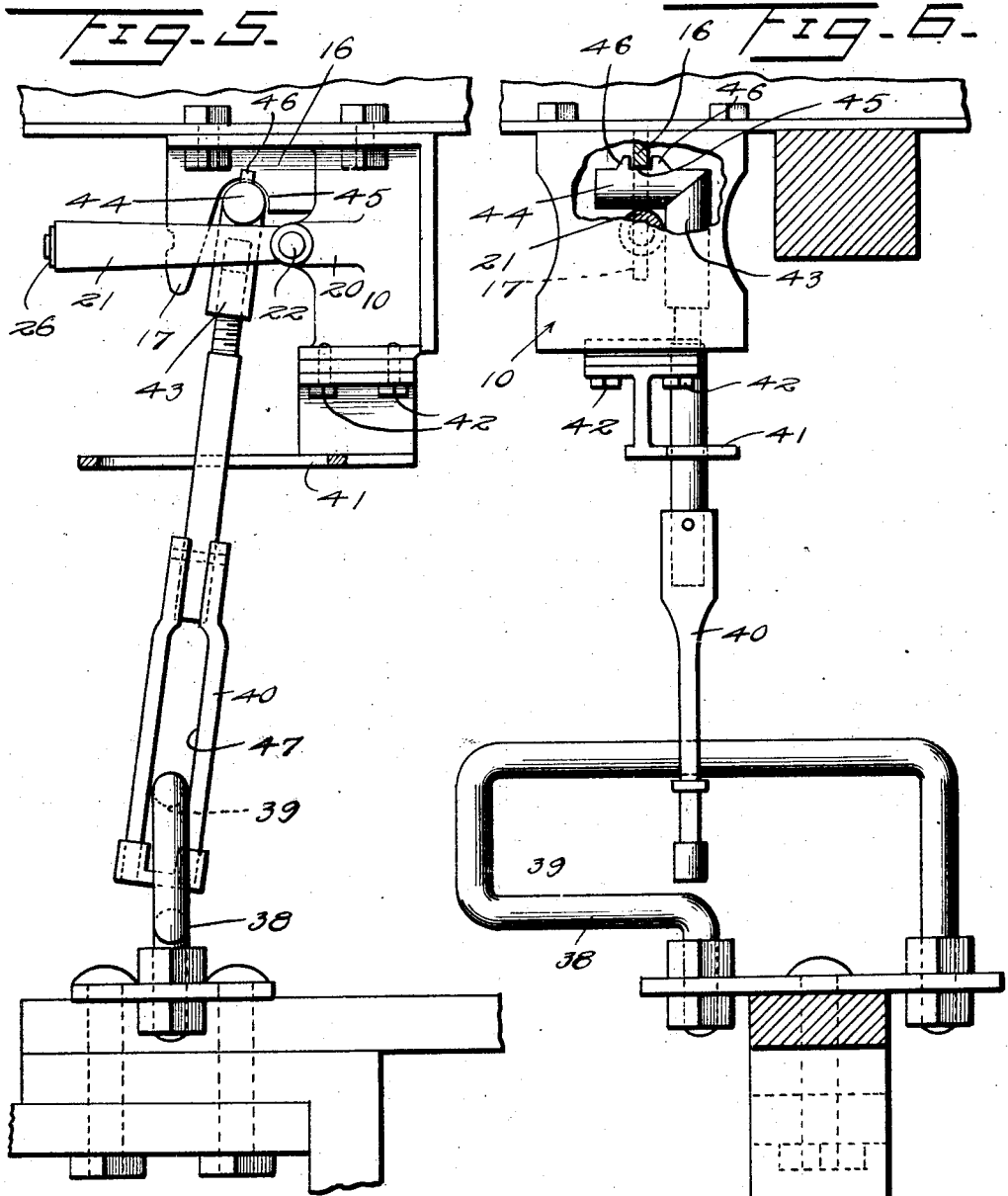

1,631,868

UNITED STATES PATENT OFFICE.

HARLY S. JOHNSON, OF ERWIN, TENNESSEE.

SAFETY DEVICE FOR LOCOMOTIVES.

Application filed July 23, 1926. Serial No. 124,519.

This invention relates to safety devices for locomotives and more particularly to a device for applying the brakes of a train in event the pony truck of the locomotive becomes derailed in any manner.

A further object of the invention is to provide a device of this character which may be applied to the pony truck without the necessity of placing any portions of the apparatus upon the locomotive deck or walkways, thus improving the structure disclosed in my prior Patents, No. 1,556,839, granted October 13, 1925, for safety devices for locomotive trucks, and No. 1,586,448, granted May 25, 1926, for safety devices for locomotive trucks. Devices of the character illustrated in these prior patents, when applied to four wheel trucks on locomotives, necessitating the use of a network of rods and levers, some of which necessarily project over the deck and walk-ways of the locomotive, which is a violation of interstate laws controlling the operation of locomotives.

A further and more specific object of the invention is to provide a device of this character which will permit normal operation of the locomotive truck without any operation of the air valve but, which upon abnormal operation of the truck, will cause the air valve to be fully opened, applying the brakes and maintaining them applied until this air valve has been reset by hand.

As is well known to those familiar with the art, the pony trucks of locomotives are located at the forward end of the locomotive and are usually spring-connected with the frame. The locomotive frame is relatively long and very rigid and since the major portion of the weight thereof lies rearwardly of the foremost driver of the pony truck, there is no tendency of the locomotive to tip when the pony truck becomes derailed. Thus, it is possible for a pony truck to become derailed and remain derailed and unnoticed during the operation of the locomotive until it encounters some obstruction, moving it to a position where it will act to derail the locomotive itself. Due to the connection of the pony truck with the locomotive, there is a considerable relative movement between the frame of the locomotive and the pony truck. For example, in hilly country, where the grade is constantly changing, the truck and adjacent portion of the frame move toward or away from one another for a considerable distance. Thus, a device for stopping the train in event of derailment must allow for considerable vertical play of the truck. It must also allow for a considerable variation in angle between the truck frame and locomotive frame, for the reason that in turning curves, the pony truck being well in advance is affected much earlier than the frame by the curve. Since there is so much movement, no direct connection can be provided, for a direct connection will result in a partial operation of the controlling valve and any partial operation of the controlling valve causes a partial setting of the brakes of the train which can only be released by a full application of the brakes. Accordingly an important object of the present invention is to provide a device which will permit all normal movements of the pony truck and which will not be partially operated by any of such movements and which, at the same time, will be immediately and fully operated in event of derailment or abnormal displacement of the pony truck with relation to the locomotive frame.

These and other objects I attain by the construction shown in the accompanying drawings, wherein for the purpose of illustration is shown a preferred embodiment of my invention and wherein:—

Figure 1 is a view partially in side elevation and partially in section showing a safety device constructed in accordance with my invention applied to the frame and pony truck of a locomotive;

Figure 2 is a section on the line 2—2 of Figure 1;

Figure 3 is a section on the line 3—3 of Figure 1;

Figure 4 is an end elevation of the handle;

Figures 5 and 6 are views at right angles to one another showing a modified construction for connecting the valve with the truck.

Referring now more particularly to the drawings, the numeral 10 generally designates a cylinder, one head 11 of which is formed with an outwardly extending web 12 through which may be directed securing elements 13 for securing the valve to the pilot beam 14 of the engine frame 15. This web is provided with a depending flange 16 substantially radial to the axis of the cylinder and having at its outer end an extension forming a nose 17, the outer edge of which is provided with a notch 18. The cylinder, in opposition to the nose 17, has formed in the wall thereof an opening 19 and at the sides of the wall of this opening is provided with pivot eyes 20. A handle 21 is provided, which is adapted to be pivoted between the eyes 20 upon a pin 22 engaged in these eyes, this handle having an opening or slot 23 through which the nose 17 may extend. In the outer end of the handle is mounted a spring-pressed plunger 24, the tension of the spring 25 of which may be adjusted by a threaded plug 26 engaged in the outer end of the handle and against which one end of the spring bears. The inner end of this plunger engages in the notch 18 to hold the handle in normal position, the lower face of the plunger being beveled at 27, so that the plunger will be forced to recede against the action of its spring upon abnormal pressure against the outer end of the handle.

Within the cylinder is arranged a piston 28, the lower end of which has applied thereto a cup washer 29 or other means for sealing against the leakage of pressure between the walls of the piston and the walls of the cylinder. This piston has an opening or recess 30 in which is engaged the inner end 31 of the handle, so that when the handle is shifted about its pivot, the piston is raised or lowered. The walls of the cylinder have an inlet port 32 which communicates with the interior of the cylinder at the lower end thereof, and at a point spaced slightly above its lower end, the walls of the cylinder are perforated by openings 33. The port 32 is adapted for connection with the train line and when the piston 28 has been moved upwardly a predetermined distance, the ports 33 are uncovered and the train line pressure can escape therethrough. The lower end of the cylinder is closed by a removable head of any suitable construction.

It will be obvious that the train line pressure is constantly acting upon the piston 28 to elevate the same and that this elevation is resisted by the lock applied to the handle. If, however, the handle has sufficient pressure applied thereto to dislodge the plunger from the notch 18, this pressure, together with the weight of the handle, will cause the handle to move downwardly until it is vertically disposed, fully opening the ports 31 and insuring an immediate reduction of the train line pressure. An actuation of the handle by abnormal relative movement of the locomotive frame and the pony truck frame 34 may be obtained in either of two manners. In Figures 1 and 2, I have shown the handle, the outer end of which is widened transversely, as having secured thereto a plate 35 of desired length, the ends of which are upturned and oppose the free edge 36 of a plate 37 which is secured to the truck frame. In applying the valve and plate to the pilot beam and truck, care is taken that the upturned ends 35$^a$ of the plate 35 are spaced from the free edge 36 of the plate 37 a distance equal to the maximum distance through which the truck moves away from the pilot beam in normal operation.

It will, of course, be obvious that as the truck moves away from the pilot beam, the free edge 36 approaches the flanges 35$^a$ and if this movement is excessive, will engage therewith. Movement of the truck frame toward the locomotive will, of course, cause a separation of the flanges 35$^a$ and free edge 36 of the plate 37, so that no operation will take place. Thus, full freedom of movement of the truck frame in a vertical direction is provided for. By placing the valve and plate at the approximate center of the vehicle, the relative movement at curves is reduced to a minimum and the plates 35 and 37 can be made of proper width to compensate for this and insure the plates 36 overlying the plate 35 at all times.

In the form shown in Figures 5 and 6, I employ a connection similar to that shown in my prior Patent, No. 1,586,448, above referred to. Here yokes 38 are connected to the truck frame, these yokes providing transversely elongated eyes 39 upon the truck frame. A stirrup 40 engages the yoke and has its upper end directed through a guide 41 secured to the lower head of the cylinder by the bolts 42 securing this lower head to the cylinder. The upper end of the yoke is provided with an L-shaped head, one arm 43 of which is secured to the yoke and the other arm 44 of which is directed between the upper surface of the handle 21 and the adjacent face of the flange 16. The flange is notched at 45 immediately inward of the nose 17 to permit the passage of this arm. The arm is provided with spaced lugs 46 engaging opposite side faces of the flange, so that transverse displacement of the arm is prevented. The guide and yoke connection of the arm, together with the pivotal mounting of the arm upon the lever and within the notch, will permit the truck frame to have all necessary freedom to compensate for rotating movements of the truck frame with relation to the engine frame. The eye 47 of the arm which receives the yoke is vertically elongated to provide for all necessary vertical movement on the part of the truck frame.

It will be obvious that the constructions of this character may be very readily applied to the locomotive and will effectually act to prevent movement of the locomotive immediately upon derailment of the pony truck. It will likewise be obvious that the structure illustrated is capable of a certain range of change and modification without materially departing from the spirit of the invention and I accordingly do not limit myself to such specific structure except as hereinafter claimed.

I claim:

1. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames.

2. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of said cylinder having an extension provided with a nose, the handle being pivoted to the cylinder and engaging the piston through an opening formed in the wall thereof, said handle being provided with a spring-pressed plunger engaging a notch in said nose when the handle is in said position.

3. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of the cylinder having a head extended to provide an attaching plate whereby it may be secured to the associated frame, said attaching plate having a flange providing a nose in spaced relation to the cylinder, the handle being pivoted to the cylinder and engaging the piston through an opening formed in the wall of the cylinder, said handle having a spring-pressed plunger engaging a notch in the nose when the handle is in said position.

4. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of the cylinder having a head extended to provide an attaching plate whereby it may be secured to the associated frame, said attaching plate having a flange providing a nose in spaced relation to the cylinder, the handle being pivoted to the cylinder and engaging the piston through an opening formed in the wall of the cylinder, said handle having a spring-pressed plunger engaging a notch in the nose when the handle is in said position, the nose extending through a slot formed in the handle.

5. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of the cylinder having a head extended to provide an attaching plate whereby it may be secured to the associated frame, said attaching plate having a flange providing a nose in spaced relation to the cylinder, the handle being pivoted to the cylinder and engaging the piston through an opening formed in the wall of the cylinder, said handle having a spring-pressed plunger engaging a notch in the nose when the handle is in said position, the nose extending through a slot formed in the handle, said handle when the piston is moved to the opposite end of the cylinder by the train line pressure being completely disengaged from said nose and extending longitudinally of the cylinder.

6. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of the cylinder having a head extended to provide an attaching plate whereby it may be secured to the associated frame, said attaching plate having a flange providing a nose in spaced relation to the cylinder, the handle being pivoted to the cylinder and engaging the piston through an opening formed in the wall of the cylinder, said handle having a spring-pressed plunger engaging a notch in the nose when the handle is in said position, the nose extending through a slot formed in the handle, said handle when the piston is moved to the opposite end of the cylinder by the train line pressure being completely disengaged from said nose and extending longitudinally of the cylinder, the connection between the other of the frames and the handle including a yoke operatively engaged with said other frame to permit normal relative movement of the frame without disengagement of the handle.

7. In a safety device for indicating derailments of locomotive trucks and in combination with the frames of the truck and locomotive, a cylinder having a port in the wall thereof secured to one of said frames, a connection between the cylinder at one end thereof and a train line pipe of the locomotive, a piston within the cylinder and normally urged to the opposite end of the cylinder by the train line pressure, a handle for shifting the piston, a latch yieldably resisting movement of the handle from a position in which the piston closes communication between the train line pipe and said port and an operative connection between the other of the frames and said handle shifting the handle to disengage the same from the latch upon abnormal separation of said frames, one end of the cylinder having a head extended to provide an attaching plate whereby it may be secured to the associated frame, said attaching plate having a flange providing a nose in spaced relation to the cylinder, the handle being pivoted to the cylinder and engaging the piston through an opening formed in the wall of the cylinder, said handle having a spring-pressed plunger engaging a notch in the nose when the handle is in said position, the nose extending through a slot formed in the handle, said handle when the piston is moved to the opposite end of the cylinder by the train line pressure being completely disengaged from said nose and extending longitudinally of the cylinder, the connection between the other of the frames and the handle including a yoke operatively engaged with said other frame to permit normal relative movement of the frame without disengagement of the handle, the upper end of said yoke having an angular arm engaging over the handle between the handle and the adjacent face of the flange, said arm having spaced lugs engaging opposite side faces of the flange.

In testimony whereof I hereunto affix my signature.

HARLY S. JOHNSON.